Figure 1:
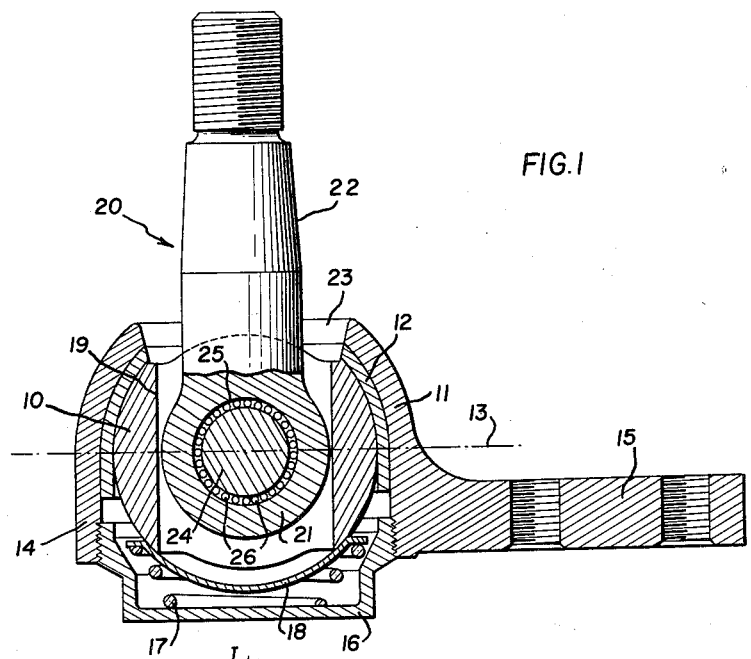

Dec. 11, 1962  F. H. VAN WINSEN  3,068,032
BALL JOINT CONNECTION
Filed Oct. 27, 1959

INVENTOR.
FRIEDRICH H. VAN WINSEN

BY Dickey, Craig and Freudenberg
ATTORNEYS

United States Patent Office 3,068,032
Patented Dec. 11, 1962

3,068,032
BALL JOINT CONNECTION
Friedrich H. van Winsen, Kirchheim, Teck, Germany, assignor to Daimler-Benz Aktiengesellschaft, Stuttgart-Unterturkheim, Germany
Filed Oct. 27, 1959, Ser. No. 849,428
Claims priority, application Germany Nov. 13, 1958
7 Claims. (Cl. 287—90)

The present invention relates to a ball and socket joint for operatively connecting two parts adapted to move with respect to each other in more than one plane, whereby an inner at least partly spherically-shaped joint member is coordinated to or operatively connected with a first connecting part, and an outer, hollow, at least partly spherically-shaped joint member is coordinated to or operatively connected with a second connecting part. The present invention is of particular significance in connection with wheel suspensions in motor vehicles.

Ball joints of the type mentioned hereinabove are known per se in the prior art and also are oftentimes used in motor vehicles. In connection with the many applications and usages thereof, there exists the desire to construct the ball and socket joint particularly frictionless, or as frictionless as possible, in a predetermined plane of movement. This plane of movement, for example, in wheel suspensions, may be the spring plane thereof, i.e. the plane in which the wheel guide members, such as the guide arms or the like, carry out normally the swinging movements thereof.

The particular problem mentioned hereinabove is solved according to the present invention by operatively connecting, in the aforementioned ball point, one of the connecting parts with the joint member coordinated thereto by means of an anti-friction bearing in order to achieve relative movements of the connecting parts in one plane, preferred with respect to the friction losses.

The advantage that may be obtained in accordance with the present invention resides in the fact that such a ball joint enables practically completely frictionless movements in a predetermined plane. In connection with the present invention, one construction is preferred according to which the first connecting part is operatively connected with the spherically-shaped joint member coordinated thereto by an anti-friction bearing disposed on the inside of this joint member. As a result of this arrangment of the anti-friction bearing within the joint member, no additional space requirements become necessary so that the ball joint according to the present invention has practically the same size as any of the known prior art ball joints.

In one embodiment of the present invention, one connecting part is constructed as a threaded pin member provided with a conical seating surface and with an eye portion at the forward end thereof. The eye portion engages into the spherically-shaped joint member and is supported on the inside thereof by needle bearings. Appropriately, a transversely extending bolt member is rigidly emplaced into the eye portion of the aforementioned first connecting part which bolt member is supported on both sides of the eye portion by means of needle bearings within the spherically-shaped joint member. This construction enables a simple assembly. However, it is also within the purview of the present invention to reverse the parts, i.e. by securing the bolt member in the spherically-shaped ball or socket joint member, and to support the eye portion of the connecting part on the bolt member by appropriate needle bearings.

Accordingly, it is an object of the present invention to provide a ball joint for connecting two parts with each other which are adapted to move relative to each other in more than one plane, and in which the movements in one preferred plane are kept as frictionless as possible.

Another object of the present invention is the provision of a ball joint having essentially frictionless movement in a preferred plane which essentionally does not exceed the size of a corresponding prior art ball joint.

Still another object of the present invention is the provision of a ball joint provided with appropriate anti-friction bearings operative in one preferred plane of relative movement of the two parts of the ball joint with respect to each other, which essentially does not require any additional space insofar as the ball joint overall construction is concerned.

Still another object of the present invention is the provision of a ball joint construction for operatively connecting with each other two parts movable relative to each other in more than one plane, and provided with anti-friction bearings to make one plane of these movements as frictionless as possible, which may be relatively easily assembled.

Figure 2:
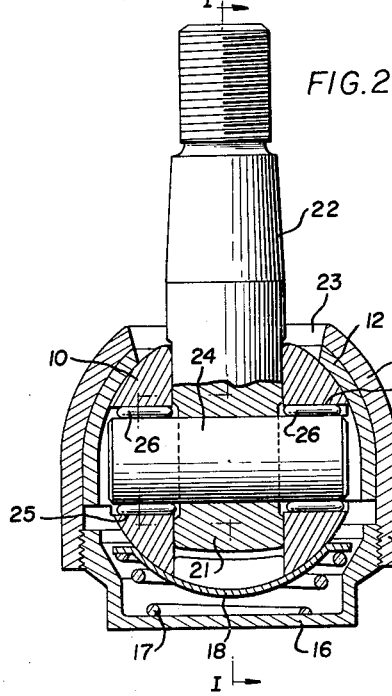
Figure 3:
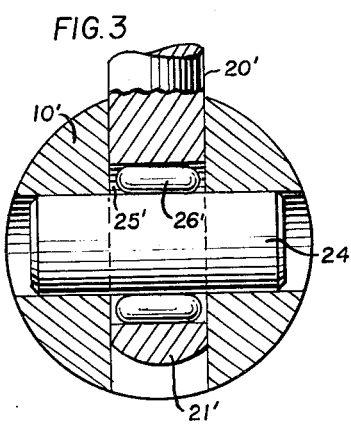

These and other objects, features and advantages of the present invention will become more obvious from the following description when taken in connection with the accompanying drawing which shows, for purposes of illustration only, one embodiment in accordance with the present invention and wherein FIGURE 1 is a longitudinal cross-sectional view through a ball joint in accordance with the present invention taken along line I—I of FIGURE 2, FIGURE 2 is a longitudinal cross-sectional view of the ball joint of FIGURE 1 taken at right angles with respect to the cross-secional view of FIGURE 1, and FIGURE 3 is a partial longitudinal cross-sectional view similar to FIGURE 2 of a modification of the present invention.

Referring now to the drawing, wherein like reference numerals are used throughout the two views to designate corresponding parts, the ball and socket joint illustrated in FIGURES 1 and 2 is formed by an inner joint member 10 of spherical or partly spherical shape, and by an outer joint member 11 which has at least a partly hollow spherical shape. A disk-shaped member 12 having self-lubricating properties is inserted into the hollow spherically-shaped socket member 11 for purposes of receiving therein the ball member 10, whereby the disk-shaped member 12 may be made of synthetic or other bearing material, having the desired self-lubricating characteristics. The hollow spherically-shaped socket member 11 is constructed of hollow spherical shape only up to the center plane 13 thereof and extends essentially cylindrically in the lower part 14 thereof in order to enable assembly and removal of the inner ball joint member 10.

The hollow, spherically-shaped socket member 11 simultaneously forms a connecting part 15 of flange-like or any other suitable construction or is operatively connected with the same in any suitable manner. The connecting part 15 serves for purposes of connection, for example, by means of screws or bolt or similar elements, with another machine part intended to be operatively connected with another element by means of the universal joint, for example, for purposes of connection with the lower transverse guide member of the wheel suspension of a motor vehicle.

The hollow, spherically-shaped socket joint member 11 is closed off on the bottom thereof by a cover 16 or a similar closure member which is threadably inserted into the cylindrical part 14 or is suitably secured thereat in any other suitable manner. A spring 17 abuts against the cover 16 and retains the spherically-shaped cap member 18 in continuous abutment against the spherically-shaped ball joint member 10. The ball joint member 10 is thereby constantly urged and effectively pressed against the upper hollow spherically-shaped part of the outer socket joint member 11 by means of spring 17.

The spherically-shaped inner ball joint member 10 is provided with a continuous longitudinal aperture 19, for example, of rectangular cross-section extending clear through the same, into which engages the connecting part generally designated by reference numeral 20 with the eye portion 21 thereof. The connecting part 20 itself is thereby constructed as a threaded bolt member of known construction provided with a conically shaped seating surface 22 and with an eye portion 21 at the forward end thereof. The connecting part 20 serves for purposes of connection with the other machine part, for example, with the wheel carrier of a motor vehicle or the like. The hollow spherically-shaped outer socket joint member 11 is thereby provided along the top thereof with an aperture 23 to enable the connecting part 20 to extend therethrough.

The connecting part 20 is pivotally supported at the ball joint member 10 by means of appropriate anti-friction bearings of known construction. For that purpose, a bolt member 24 is rigidly inserted into the eye portion 21. The bolt member 24 engages on each side of the eye portion 21 in a bore 25 provided in the spherically-shaped inner ball joint member 10. Anti-friction roller members 26 form a needle bearing for the bolt member 24 on each side of the eye portion 21. However, it is also understood that the installation and use of ball bearings or any other antifriction bearings is within the purview and scope of the present invention. As a result of this arrangement, the connecting part 20 is rotatably supported within the needle bearings 25, essentially without friction, within the plane of the drawing of FIGURE 1.

While I have shown and described in FIGURES 1 and 2 one embodiment in accordance with the present invention, it is understood that the same is not limited thereto but is susceptible of many changes and modifications within the spirit and scope of the present invention. For example, it would also be within the purview of the present invention, as illustrated in FIGURE 3, to secure the bolt member 24 within the spherically-shaped inner joint member 10', and to arrange the needle bearings or other anti-friction bearings 26' within a bore 25' arranged in the eye portion 21' of the connecting part 20'. Furthermore, the present invention may also be modified in such a manner that the other connecting part 15 may be operatively connected in a similar manner by means of anti-friction bearings with the hollow spherically-shaped outer socket joint member 11.

Thus, it is obvious that the present invention is not limited to the details described and shown herein, but is susceptible of many changes and modifications, and I, therefore, do not wish to be limited to these details but intend to cover all such changes and modifications as are encompassed by the scope of the present claims.

I claim:

1. A ball joint assembly for connecting two parts in such a manner as to allow swinging movements of said parts with respect to each other in several planes, and to allow swinging movement of said parts with respect to each other within a preferred plane of movement, comprising a housing secured to one of said parts and including a hollow socket member, a ball joint member arranged within said socket member and movable within said socket member in several planes, said ball joint member having an aperture extending therethrough, said aperture having an elongated cross-sectional area, said preferred plane of movement being the central longitudinal plane of said aperture, one end of the other of said parts extending into said aperture, and means for securing said end of the other part to said ball joint member within said aperture to allow said swinging movements of said parts with respect to each other in several planes by movement of said ball joint member within said socket member, said last-mentioned means including means for allowing swinging movement of said other part with respect to said one part within said aperture in said preferred plane of movement and including anti-friction means enabling said movement within said preferred plane to be essentially frictionless.

2. A ball joint assembly for connecting two parts in such a manner as to allow swinging movements of said parts with respect to each other in several planes, and to allow a further swinging movement of said parts with respect to each other within a preferred plane of movement, comprising a housing secured to one of said parts and including a hollow socket member, a ball joint member arranged within said socket member so as to be movable within said socket member in said several planes, said ball joint member having an aperture extending therethrough, one end of the other of said parts extending into said aperture, said end of the other part having an eye portion, and means including a bearing pin extending through said eye portion for securing said end of the other part to said ball joint member within said aperture, to thereby allow said swinging movements of said parts with respect to each other upon movement of said ball joint member within said socket member, said last-mentioned means and said aperture allowing said further swinging movement of said other part with respect to said one part within said aperture in said preferred plane of movement and including anti-friction means enabling said movement of the other part within said preferred plane of movement to be essentially frictionless.

3. A ball joint assembly as defined in claim 2, wherein said bearing pin is rigidly secured to said ball joint member at each end thereof, and wherein said anti-friction means are arranged within said eye portion of said other part.

4. A ball joint assembly as defined in claim 2, wherein said other part is rigidly secured to said bearing pin at said eye portion, and wherein said anti-friction means are arranged at each end of said bearing pin within said ball joint member.

5. A ball joint assembly for connecting two parts in such a manner as to allow swinging movements of said parts with respect to each other in several planes, and to allow a further swinging movement of said parts with respect to each other within a preferred plane of movement, comprising a housing secured to one of said parts and including a substantially spherically-shaped hollow socket member, a substantially spherically-shaped ball joint member arranged within said socket member so as to be movable within said socket member in said several planes, said ball joint member having a substantially rectangularly-shaped aperture extending therethrough, said preferred plane of movement being essentially the central longitudinal plane of said aperture, one end of the other of said parts extending into said aperture, said end of the other part having an eye portion, and means including a bearing pin extending through said eye portion for securing said end of the other part to said ball joint member within said aperture, to thereby allow said swinging movements of said parts with respect to each other upon movement of said ball joint member within said socket member, said last-mentioned means and said end of the other part allowing said further swinging movement of said other part with respect to said one part within said aperture in said preferred plane of movement and including anti-friction means enabling said movement of the other part within said preferred plane of movement to be essentially frictionless.

6. A ball joint assembly as defined in claim 5, wherein said ball joint member has a second aperture extending therethrough transversely to said rectangular-shaped aperture, said bearing pin extending longitudinally through said second aperture, and wherein said anti-friction means are arranged at each end of said bearing pin within said second aperture, and wherein said other part is rigidly secured to said bearing pin at said eye portion of said other part.

7. A ball joint assembly as defined in claim 5, wherein said ball joint member has a second aperture extending therethrough transversely to said rectangular-shaped aperture, and wherein said bearing pin extends longitudinally through said second aperture and is rigidly secured to said ball joint member at each end thereof, and wherein said anti-friction means are arranged within said eye portion of said other part essentially at the center of said bearing pin.

References Cited in the file of this patent

UNITED STATES PATENTS

| | | |
|---|---|---|
| 1,548,382 | Paul | Aug. 4, 1925 |
| 2,037,208 | Buckwalter | Apr. 14, 1936 |
| 2,071,341 | Hufferd et al. | Feb. 23, 1937 |
| 2,388,950 | Booth | Nov. 13, 1945 |
| 2,494,739 | Booth | Jan. 17, 1950 |
| 2,971,770 | Wagner | Feb. 14, 1961 |